United States Patent
Kotani

(10) Patent No.: US 7,110,692 B2
(45) Date of Patent: Sep. 19, 2006

(54) IMAGE FORMING DEVICE

(75) Inventor: Masaki Kotani, Uji (JP)

(73) Assignee: Murata Kikai Kabushiki Kaisha, Kyoto (JP)

(*) Notice: Subject to any disclaimer, the term of this patent is extended or adjusted under 35 U.S.C. 154(b) by 88 days.

(21) Appl. No.: 10/945,363

(22) Filed: Sep. 20, 2004

(65) Prior Publication Data

US 2005/0069336 A1 Mar. 31, 2005

(30) Foreign Application Priority Data

Sep. 25, 2003 (JP) ............................. 2003-332663

(51) Int. Cl.
*G03G 15/00* (2006.01)
(52) U.S. Cl. .................. 399/81; 399/8; 399/9; 399/411
(58) Field of Classification Search .................. 399/80, 399/81

See application file for complete search history.

(56) References Cited

U.S. PATENT DOCUMENTS 4,500,971 A * 2/1985 Futaki et al. .................. 399/38
2001/0019665 A1 * 9/2001 Kawakami .................... 399/12
2004/0067073 A1 * 4/2004 Cannon ........................ 399/81
2004/0109699 A1 * 6/2004 Skrainar et al. ............... 399/9

FOREIGN PATENT DOCUMENTS

| JP | 60-181921 | 9/1985 |
| JP | 07-149027 | 6/1995 |
| JP | 08-297439 | 11/1996 |
| JP | 11-053167 | 2/1999 |
| JP | 2001-136330 | 5/2001 |
| JP | 2002-236029 | 8/2002 |
| JP | 2003-058360 | 2/2003 |

* cited by examiner

*Primary Examiner*—David M. Gray
*Assistant Examiner*—Ryan D. Walsh
(74) *Attorney, Agent, or Firm*—Hogan & Hartson LLP

(57) ABSTRACT

An image forming device includes a voice data storage unit which stores voice guidances by designating attributes for each of the voice guidances, a voice output unit which outputs the voice guidances and a control unit which extracts a necessary voice guidance from the voice storage unit when it is necessary to output the voice guidance and outputs the voice guidance from the voice output unit according to the attributes of the voice guidance.

11 Claims, 4 Drawing Sheets

FIG. 3

| No.: MESSAGE | PRIORITY ORDER | VOLUME | EMPHASIS TIME | EMPHASIS PRIORITY ORDER | EMPHASIS VOLUME | EMPHASIS INTERVAL | EMPHASIS SPEED |
|---|---|---|---|---|---|---|---|
| 01: PLEASE REMOVE JAMMED PAPER. | A | 1 | 60 | | +3 | | |
| 02: | A | 1 | 30 | | +2 | | |
| 03: THERE IS JAMMED PAPER. | B | 2 | 10 | | 0 | | |
| 04: | B | 2 | 5 | | 0 | | |
| 05: PLEASE SUPPLY PAPER. | C | 3 | 10 | | 0 | | |
| 06: | C | 3 | 0 | | 0 | | |
| 07: THERE IS ORIGINAL REMAINING. | D | 4 | 0 | | 0 | | |
| | | | | | | | |

- PRIORITY ORDER: PRIORITY (HIGH) A>D (LOW)
- VOLUME: (LARGE) 4>1 (SMALL)
- EMPHASIS TIME: UNIT (s)

IMAGE FORMING DEVICE

BACKGROUND OF THE INVENTION

1. Field of the Invention

The present invention relates to an image forming device having a function for outputting a voice guidance.

2. Description of the Related Art

As a device having a function for outputting a voice guidance (a function for producing voice data), according to a first conventional technology, when there is a change in a state of an engine part of a printer, a control unit retrieves voice data (which can be replaced by a user) corresponding to the change in the state from a Random Access Memory (RAM) and produces the voice message from a speaker. For example, when a surrounding volume is loud, or when a surrounding lightness is light, or when the user is away from the printer, the volume of the voice message is increased. On the contrary, when the surrounding volume is small, or when the surrounding lightness is dark, or when the user is standing in proximity to the printer, the volume of the voice message is turned down. In case there is a change in the state of the printer such as a failure in the printer that is generated when the user is away from the printer, the voice message is generated when the user returns in close proximity to the printer.

According to a second conventional technology, an appropriate output sound is provided so that when a copy image quality is selected, the selected region is emphasized. For example, when a region of a brighter copy image quality is selected, a sound of a tone tuned higher is provided. When a region of a darker copy image quality is selected, a sound of a tone tuned lower is provided.

According to a third conventional technology, the state of a device can be grasped easily from a position located away from the device in accordance with the contents or the volume of a voice of a voice notifying unit. In addition, when the state of the device is not necessary to be displayed during the nighttime or during the absence of a user, the output of the voice is stopped by a preset timer or the volume is reduced.

According to the first conventional technology, the voice message is generated according to the change in the state of the printer (for example, a failure in the printer that is generated when the user is away from the printer). In addition, the volume of the voice message is adjusted to be loud or soft according to the surrounding volume, the surrounding lightness and the presence or the absence of the user. However, the volume is adjusted to be either loud or soft when generating the voice message. In addition, only the failures that are generated when the user is away from the printer are assumed for the change in the state in the printer. The first conventional technology was not made in consideration of the following circumstances. For example, there is no description or suggestion made regarding a case in which while a certain voice message is being generated, another voice message becomes necessary to be generated.

According to the second conventional technology, the sounds of high and low tones are provided according to the copy image quality. According to the third conventional technology, the state of the device is determined by the contents or the volume of the voice at a position located away from the device. Therefore, information that is most necessary for the user cannot be presented promptly and accurately in response to various possible circumstances of the device.

SUMMARY OF THE INVENTION

The present invention has been made in consideration of such drawbacks. An advantage of the present invention is to provide an image forming device which can promptly present a voice guidance most necessary for the user at a present moment.

To accomplish an advantage of the present invention, according to a first aspect of the present invention, an image forming device includes a voice data storage unit, a voice output unit and a control unit. The voice data storage unit stores voice guidances by designating attributes for each of the voice guidances. The voice output unit outputs the voice guidances. When it is necessary to output a voice guidance, the control unit extracts the necessary voice guidance from the voice data storage unit. Then, the control unit controls to output the voice guidance from the voice output unit according to the attributes of the voice guidance.

In the image forming device, the attributes of each of the voice guidances are specifically elements of a priority order, volume, an interval and a speed of the output.

When outputting the voice guidances, the control unit controls to output the voice guidances in an order of descending priorities in the attributes in accordance with other elements in the attributes of the voice guidances. According to the present invention, the voice guidance that is most suitable for the present circumstance of the image forming device can be output promptly. Therefore, information presented to the user can be changed according to the circumstance of the device. Accordingly, the user can easily grasp a measure the user should take next or under what circumstance the device is provided. As a result, an operationality of the device is improved.

BRIEF DESCRIPTION OF THE SEVERAL VIEWS OF THE DRAWINGS

FIG. 3 shows a table of voice guidances stored in a voice data memory in the facsimile machine according to the embodiment of the present invention.

DETAILED DESCRIPTION OF THE INVENTION

Embodiments of the present invention will be described hereinafter.

Figure 1:
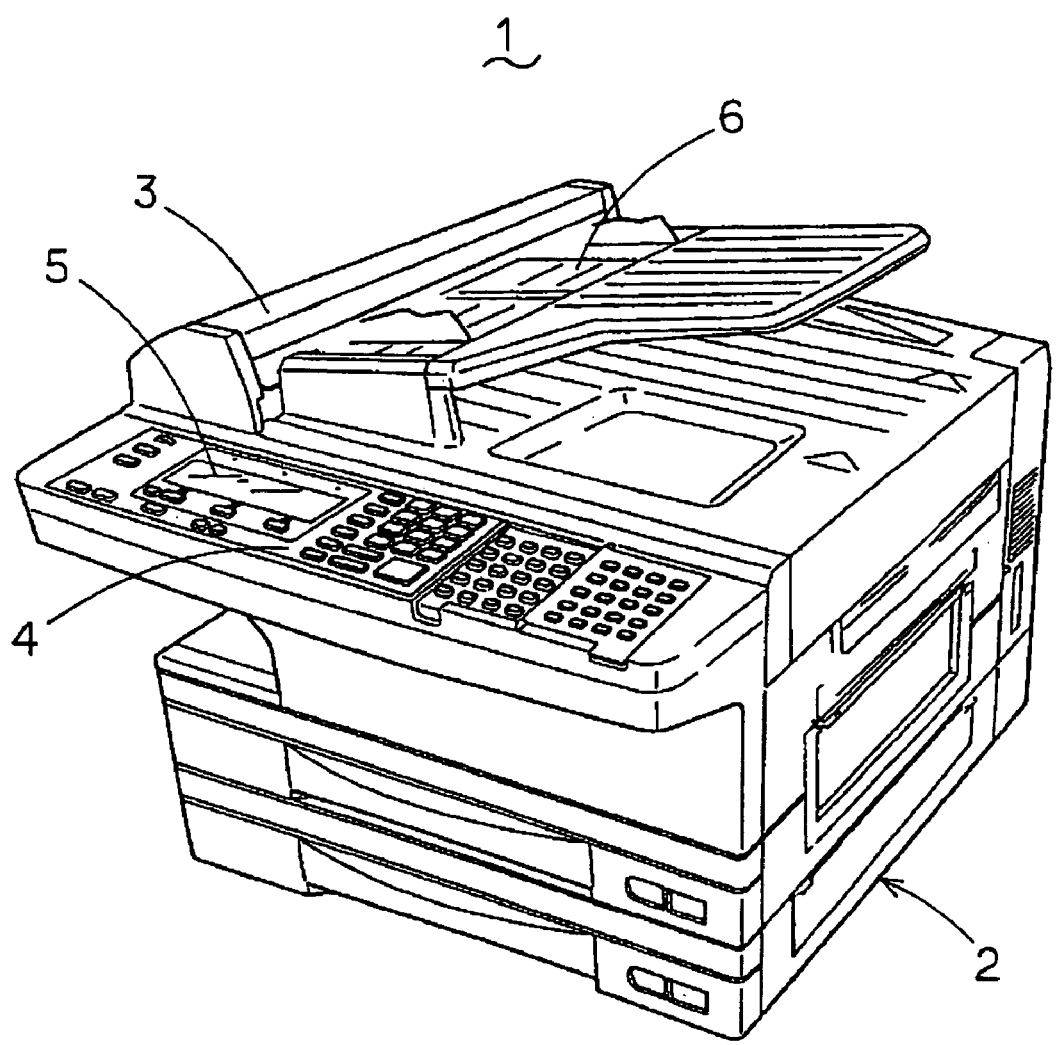
FIG. 1 is an exterior perspective view of a facsimile machine (a multifunction peripheral having a facsimile function and a copy function) as an image forming device according to an embodiment of the present invention.

FIG. 1 is an exterior perspective view of a facsimile machine as an image forming device according to an embodiment of the present invention. The facsimile machine 1 is formed as a multifunction peripheral having a facsimile function and a copy function. An Automatic Document Feeder (ADF) 3 is disposed on one side of an upper part of a machine frame 2. A document supply tray 6 for setting original documents is disposed on the upper part of the machine frame 2. An operation unit 4 having a display unit 5 is provided at a front side on the upper part of the machine frame 2. Provided that functions of each of the units are not different from functions of a conventional machine, a detailed description will be omitted.

Figure 2:
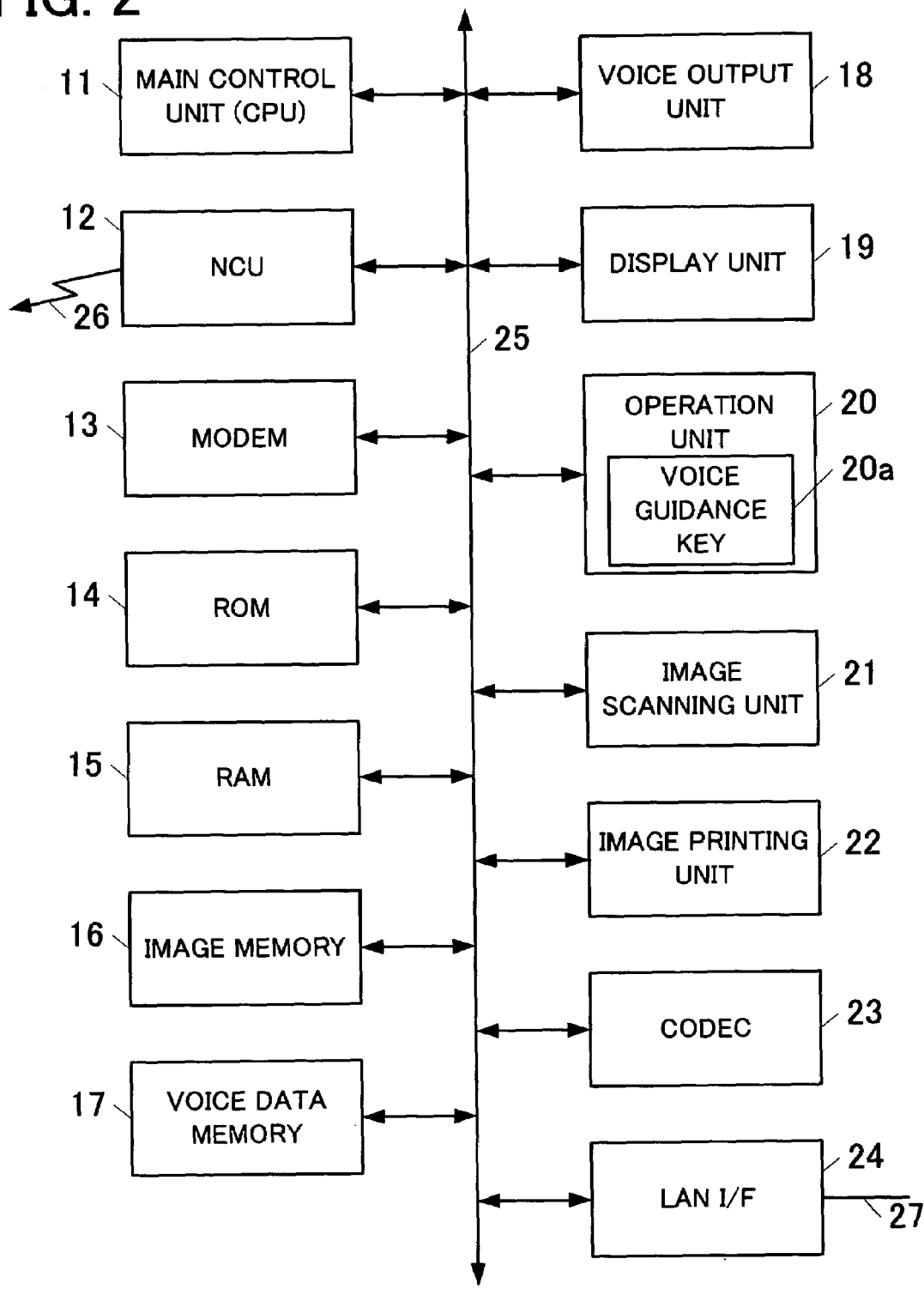
FIG. 2 is a block diagram showing an example of a configuration of the facsimile machine according to the embodiment of the present invention.

FIG. 2 is a block diagram showing an example of a configuration of the facsimile machine 1. The facsimile machine 1 includes a main control unit (Central Processing Unit (CPU)) 11, a Network Control Unit (NCU) 12, a modem 13, a Read Only Memory (ROM) 14, a Random Access Memory (RAM) 15, an image memory 16, a voice data memory (voice data storage unit) 17, a voice output unit 18, a display unit 19, an operation unit 20, an image scanning unit 21, an image printing unit 22, a codec 23, a Local Area Network InterFace (LAN I/F) 24 and a bus 25.

The main control unit 11 controls each of the units of the facsimile machine 1 in accordance with a program stored in the ROM 14. The main control unit 11 includes a function for extracting necessary voice guidance from the voice data memory 17 when the facsimile machine 1 is necessary to output voice guidance and outputs the voice guidance from the voice output unit 18 according to attributes of the voice guidance.

The NCU 12 controls a connection established with a telephone line 26. The NCU 12 includes a function for transmitting a telephone number of a destination (a corresponding dial signal) and a function for detecting an incoming call. The NCU 12 receives a dial tone, a calling tone (CNG) signal or the like from the telephone line 26. The modem 13 modulates transmission data and demodulates received data following V.17, V.27ter, V.29 or the like in accordance with a facsimile transmission control procedure based on the International Telecommunication Union-Telecommunications (ITU-T) Recommendations T.30.

The ROM 14 stores programs for controlling the entire facsimile machine 1. The RAM 15 temporarily stores various pieces of information relating to the facsimile machine 1. The image memory 16 temporarily stores received image data and image data scanned by the image scanning unit 21.

The voice data memory 17 stores voice guidances by designating an attribute for each of the voice guidances. The voice data memory 17 can be provided in the RAM 15. The voice guidances are stored as a table shown in FIG. 3 as an example. In the example shown in FIG. 3, there are messages 01, 02, 03 and so forth as the voice guidances. For each of the messages, a priority order A, B, C, D and so forth, volume 1, 2, 3, 4 and so forth, an emphasis time (second) 60, 30, 10, 5, 10, 0 and so forth, an emphasis priority order, an emphasis volume +3, +2, 0 and so forth, an emphasis interval and an emphasis speed are designated as attributes. When outputting the voice guidances, the main control unit 11 outputs the voice guidances in an order of descending priorities in the attributes in accordance with the other elements in the attributes.

In the table shown in FIG. 3, the "priority order" is information for determining which voice guidance to prioritize when outputting a plurality of voice guidances. The "volume" is information for designating the volume level of each of the voice guidances. The "interval" is information for designating a pitch of the interval for each of the voice guidances. The "speed" is information for designating an output speed for each of the voice guidances. The "priority order" and the "volume" are default values set in advance. The "emphasis time" is an output time when outputting with an emphasis temporarily. The "emphasis priority order", the "emphasis volume", the "emphasis interval" and the "emphasis speed" are set values when outputting with an emphasis temporarily. For example, when outputting the message 01 with an emphasis temporarily, in case the emphasis volume is +3, then, the volume is changed from 1 to 4 and a message "Please remove jammed paper" is output repeatedly for 60 seconds. The voice output unit 18 outputs the voice guidance stored in the voice data memory 17 from a speaker or the like.

The voice guidance that is necessary to be emphasized temporarily is information that is preferable to be sent to the user with preference temporarily for a change in a state of the facsimile machine 1. In case such a change in the state is generated, the voice guidance is output according to an order of the emphasis priority order and not according to the default priority order. For example, in case the recording paper is jammed, it is necessary to output the voice guidance for removing the jammed paper. However, in such a case, when the user sets an original document to the ADF (when a change in the state is generated that an original document has been set), first, the voice guidance relating to such a change in the state is output. Then, the voice guidance relating to the jammed paper is output. In this case, even when the default priority order of the voice guidance relating to the jammed paper is higher than the default priority order of the voice guidance relating to the setting of the original document, the voice guidance of the latter is output preferentially.

The display unit 19 displays various pieces of information such as an operational state of the facsimile machine 1 and a period of time of a forwarding process. The operation unit 20 includes a voice guidance key 20a for the user to output the voice guidance from the voice output unit 18, and also a ten-key numeric pad, a one-touch key, a start key and other various keys. When the user operates the voice guidance key 20a, the necessary voice guidance is output from the voice output unit 18.

The image scanning unit 21 scans image data of an original document and outputs the image data. The image printing unit 22 is an electro-photographic printer. The image printing unit 22 prints out onto recording paper, received image data or image data of an original document scanned by the image scanning unit 21 in a copy operation. The codec 23 encodes image data to be transmitted and decodes received image data. The LAN I/F 24 transmits and receives various data with a remote device via a LAN 27.

Figure 4:
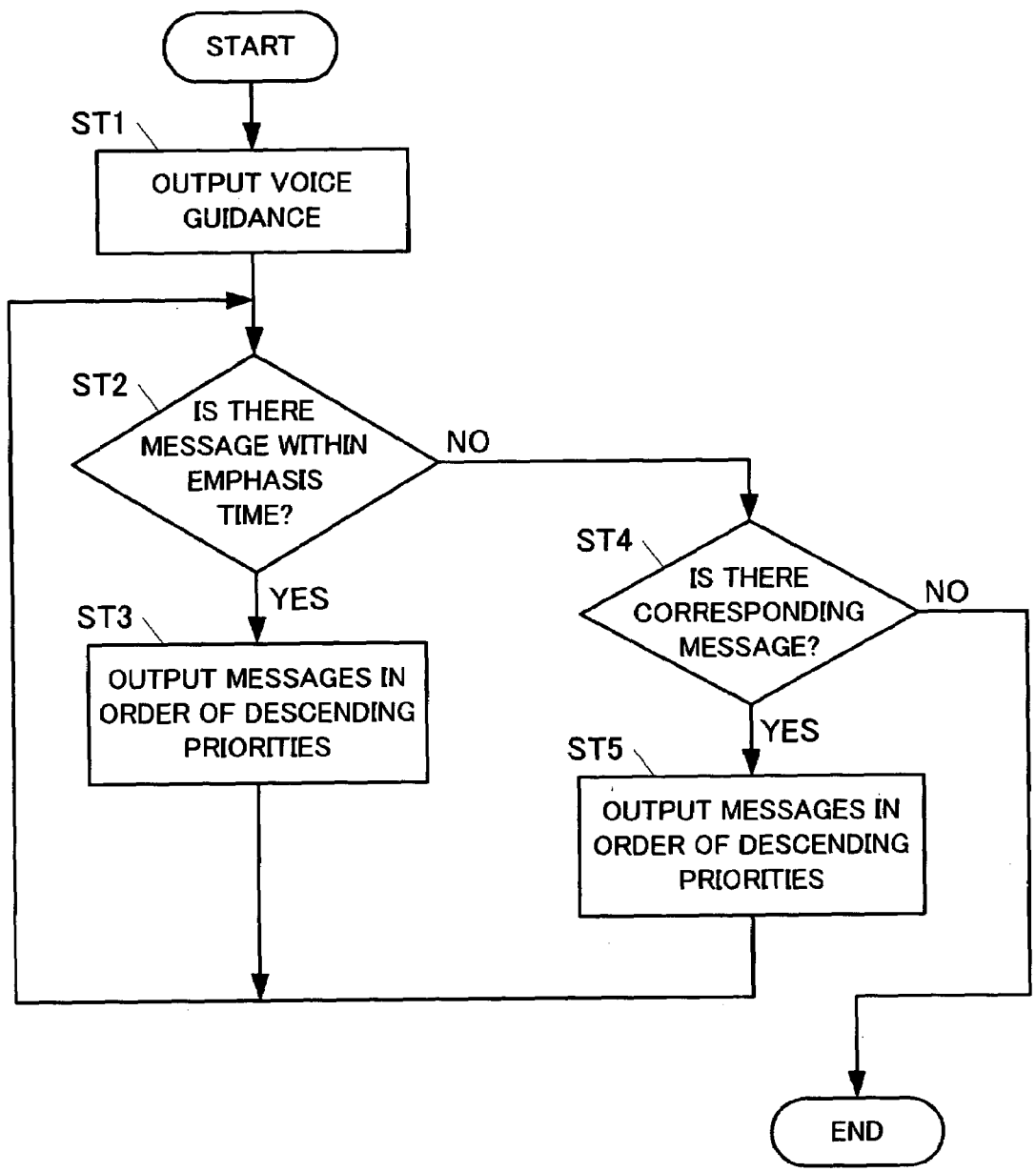
FIG. 4 is a flowchart showing an operation of the facsimile machine (an operation carried out when it is necessary to output the voice guidance) according to the embodiment of the present invention.

Next, referring to the flowchart shown in FIG. 4, an operation of the facsimile machine 1 will be described. This flowchart shows a process carried out when the facsimile machine 1 is necessary to output the voice guidance. In the example shown in the table of FIG. 3, the cases in which the facsimile machine 1 is necessary to output the voice guidance are cases in which the recording paper is jammed in the paper transportation path or the like of the facsimile machine 1 and it is necessary to remove the jammed paper, the recording papers have run out and it is necessary to supply recording paper, and an original document is remaining in the ADF.

At step ST1, when the facsimile machine 1 is necessary to output a voice guidance, at step ST2, a determination is made as to whether or not there is a voice guidance (message) to be emphasized temporarily (whether or not there is a message within an emphasis time). As a specific example, in case it is necessary to output all of the messages 01, 03, 05 and 07 in the table of FIG. 3 (assuming that the facsimile machine 1 is under such a state), since the messages 01, 03 and 05 are messages in which the emphasis time is set, the messages 01, 03 and 05 correspond to the messages that are necessary to be emphasized.

When there is a message that is necessary to be emphasized, at step ST3, a priority order is referenced for the messages that are necessary to be emphasized. Then, the messages are-output by the voice output unit 18 in an order of descending priorities in accordance with elements other than the priority order in the attributes of each of the messages. When there are a plurality of messages that are necessary to be emphasized, all of the corresponding messages are output in the order of descending priorities.

In this case, the messages 01, 03 and 05 are messages that are necessary to be emphasized. When referring to the priority order of the messages 01, 03 and 05, the priority order of the message 01 is A, the priority order of the message 03 is B and the priority order of the message 05 is C. Therefore, the voice output unit 18 outputs the messages in an order of the message 01, 03 and 05. In this case, although the default volume of the message 01 is 1, since the emphasis volume is +3, the volume of the message 01 is increase to 4. In addition, since the emphasis time is 60 seconds, the message 01 is output for 60 seconds at the volume of 4. Meanwhile, since the emphasis volumes of the messages 03 and 05 are both 0, the default volumes 2 and 3 are maintained for the messages 03 and 05, respectively. In addition, since the emphasis time of the messages 03 and 05 are both 10 seconds, the messages 03 and 05 are output for 10 seconds at the volume of 2 and 3, respectively.

After outputting the messages, the process returns to step ST2. At step ST2, a determination is made again as to whether or not there is a message within the emphasis time. That is, a determination is made as to whether or not the user has listened to the message within the emphasis time and a failure relating to the message has been eliminated. In the specific example, in case of the message 01, a determination is made as to whether or not the jammed paper has been removed by an appropriate measure of the user. In case of the message 03, a determination is made as to whether or not the jammed paper has been removed by an appropriate measure of the user. In case of the message 05, a determination is made as to whether or not paper has been supplied. When all of these failures have been solved, the determination at step ST2 results NO. However, if one failure is still remaining, the determination at step ST2 results YES and at step ST3, a message relating to the remaining failure is output. Until failures relating to the messages within the emphasis time are all eliminated, the processes of steps ST2 and ST3 are repeated.

At step ST2, when there is no message within the emphasis time from the beginning, or when there are no more messages within the emphasis time, at step ST4, a determination is made as to whether or not there is a message that is not necessary to be emphasized but that is necessary to be output. In the specific example, since the emphasis time of the message 07 is 0, the message 07 corresponds to a message that is necessary to be output. When there are messages that are necessary to be output, at step ST5, the priority order is referenced for the messages. The messages are output from the voice output unit 18 in an order of descending priorities in accordance with the elements other than the priority order in the attributes of each of the messages. In this case, when there are a plurality of messages, all of the messages are output in the order of descending priorities.

In the specific example, only the message 07 is output at the volume of 4. However, in case there are a plurality of corresponding messages, in the same manner as the message within the emphasis time, the messages are output in the order of descending priorities in accordance with the elements of the attributes.

After outputting the messages, the process returns to step ST2 and a determination is made as to whether or not there is a new message that is necessary to be output with emphasis. Alternatively, at step ST4, a determination is made as to whether or not there is a message that is necessary to be output (whether or not all failures relating to the message that are necessary to be output have been solved, or whether or not there is a new message that is necessary to be output). At step ST4, when there is no corresponding message, in other words, after all of the messages that are necessary to be output regardless of whether or not an emphasis has been output (after failures relating to all of the messages have been solved), the process ends.

Further, in the table of FIG. 3, numeric values are written only for the emphasis time and the emphasis volume. However, in case other elements (emphasis priority order, emphasis interval and emphasis speed) are set, a message is output including these elements. In particular, when it is necessary to emphasize, in case the emphasis priority order is set, the emphasis priority order is prioritized rather than the priority order.

The invention claimed is:

1. An image forming device, comprising:
   a voice data storage unit which stores voice guidances by designating attributes for each of the voice guidances;
   a voice output unit which outputs the voice guidances; and
   a control unit which extracts a necessary voice guidance from the voice storage unit when it is necessary to output the voice guidance and outputs the voice guidance from the voice output unit according to the attributes of the voice guidance, wherein
   a voice guidance that is to be emphasized temporarily changes a state in the image forming device, and the change in the state of the image forming device outputs the voice guidance according to an order of an emphasis priority order instead of a default priority order.

2. The image forming device according to claim 1, wherein the attributes of each of the voice guidances include elements of a priority order, volume, an interval and a speed of the voice guidance.

3. The image forming device according to claim 1, wherein the voice guidances are stored as a table.

4. The image forming device according to claim 1, further comprising an operation unit including a voice guidance key to output the voice guidance from the voice output unit.

5. An image forming device, comprising: means for storing voice guidances by designating attributes for each of the voice guidances;
   a voice output unit which outputs the voice guidances; and
   a control unit which extracts a necessary voice guidance from the means for storing when it is necessary to output the voice guidance and outputs the voice guidance from the voice output unit according to the attributes of the voice guidance, wherein
   a voice guidance that is to be emphasized temporarily changes a state in the image forming device, and the change in the state of the image forming device outputs the voice guidance according to an order of an emphasis priority order instead of a default priority order.

6. The image forming device according to claim 5, wherein the attributes of each of the voice guidances include elements of a priority order, volume, an interval and a speed of the voice guidance.

7. The image forming device& according to claim 5, wherein the voice guidances are stored as a table.

8. The image forming device according to claim 5, further comprising an operation unit including a voice guidance key to output the voice guidance from the voice output unit.

9. A method for manufacturing an image forming device, comprising:
   storing voice guidances;
   designating attributes for each of the voice guidances;
   outputting the voice guidances;
   extracting a necessary voice guidance when it is necessary to output the voice guidance;
   outputting the voice guidance according to the attributes of the voice guidance;
   changing a state in the image forming device by a voice guidance that is to be emphasized temporarily; and
   outputting the voice guidance according to an order of an emphasis priority order instead of a default priority order when a change in the state of the image forming device occurs.

10. The method for manufacturing an image forming device according to claim 9, further comprising assigning elements of a priority order, volume, an interval and a speed of the voice guidance to the attributes of each of the voice guidances.

11. The method for manufacturing an image forming device according to claim 9, further comprising storing the voice guidances in a table.

* * * * *